(12) United States Patent
Sun et al.

(10) Patent No.: US 9,513,448 B2
(45) Date of Patent: Dec. 6, 2016

(54) OPTICAL ASSEMBLY

(71) Applicant: InnoLight Technology (Suzhou) LTD., Suzhou, Jiangsu (CN)

(72) Inventors: Yuzhou Sun, Suzhou (CN); Long Chen, Suzhou (CN); Kewu Wang, Suzhou (CN); Weilong Li, Suzhou (CN); Xiangzhong Wang, Suzhou (CN)

(73) Assignee: InnoLight Technology (Suzhou) LTD., Suzhou (CN)

( * ) Notice: Subject to any disclaimer, the term of this patent is extended or adjusted under 35 U.S.C. 154(b) by 0 days.

(21) Appl. No.: 14/681,457

(22) Filed: Apr. 8, 2015

(65) Prior Publication Data

US 2015/0293316 A1    Oct. 15, 2015

(30) Foreign Application Priority Data

Apr. 11, 2014  (CN) .......................... 2014 2 0172931
Apr. 11, 2014  (CN) .......................... 2014 2 0172946

(51) Int. Cl.
| | |
|---|---|
| *G02B 6/36* | (2006.01) |
| *H04B 10/00* | (2013.01) |
| *H04B 10/04* | (2006.01) |
| *H04B 10/12* | (2006.01) |
| *H04B 10/06* | (2006.01) |
| *G02B 6/42* | (2006.01) |

(52) U.S. Cl.
CPC ........... *G02B 6/4246* (2013.01); *G02B 6/4214* (2013.01); *G02B 6/4215* (2013.01); *G02B 6/4286* (2013.01); *G02B 6/423* (2013.01); *G02B 6/428* (2013.01); *G02B 6/4292* (2013.01)

(58) Field of Classification Search
CPC ... G02B 6/4214; G02B 6/4215; G02B 6/4246; G02B 6/423; G02B 6/4286
USPC ........ 385/88, 89, 92–94; 398/139, 200, 201, 398/212, 214
See application file for complete search history.

(56) References Cited

U.S. PATENT DOCUMENTS

| | | | | |
|---|---|---|---|---|
| 6,560,389 | B2 * | 5/2003 | Otsuki ................. | G02B 6/2817 385/31 |
| 6,636,540 | B2 * | 10/2003 | Uebbing ............. | H01S 5/02292 372/36 |
| 6,945,711 | B2 * | 9/2005 | Chen .................... | G02B 6/4249 385/93 |
| 7,058,257 | B2 * | 6/2006 | Pan ..................... | G02B 6/29367 385/24 |

(Continued)

*Primary Examiner* — Robert Tavlykaev
(74) *Attorney, Agent, or Firm* — Finnegan, Henderson, Farabow, Garrett & Dunner, LLP

(57) ABSTRACT

This disclosure provides an optical assembly, comprising a base body and a wave filtering apparatus. A first slot is disposed on an upper surface of the base body. A total internal reflection surface and a connecting part are formed in the first slot. The total internal reflection surface reflects collimated light formed by a first lens from a light emitting apparatus. The wave filtering apparatus comprises a first part removably connected to the connecting portion, and a second portion forming a beam splitting surface. The wave filtering apparatus has a light-pervious optical coating at least on the beam splitting surface of the apparatus, and is configured to split the collimated light reflected from the total internal reflection surface into a first beam and a second beam. The first beam travels towards the side where the third lens is located, and the second beam travels towards a photoelectric detection apparatus.

10 Claims, 10 Drawing Sheets

(56) References Cited

U.S. PATENT DOCUMENTS

| | | | | |
|---|---|---|---|---|
| 8,655,181 B2* | 2/2014 | Kondo | ............... | G02B 6/4215 |
| | | | | 398/135 |
| 8,737,784 B2* | 5/2014 | Kawai | ............... | G02B 6/4292 |
| | | | | 385/47 |
| 8,923,671 B2* | 12/2014 | Hung | ............... | G02B 6/32 |
| | | | | 359/834 |
| 9,116,312 B2* | 8/2015 | Lin | ............... | G02B 6/4204 |
| 2004/0156596 A1* | 8/2004 | Parsons | ............... | G02B 6/4215 |
| | | | | 385/88 |
| 2009/0202244 A1* | 8/2009 | Jin | ............... | G02B 6/4201 |
| | | | | 398/67 |
| 2009/0252461 A1* | 10/2009 | Kihara | ............... | G02B 6/4246 |
| | | | | 385/89 |
| 2012/0263416 A1* | 10/2012 | Morioka | ............... | G02B 6/4214 |
| | | | | 385/33 |
| 2013/0168537 A1* | 7/2013 | Shin | ............... | G02B 6/4206 |
| | | | | 250/216 |
| 2013/0242401 A1* | 9/2013 | Shibuya | ............... | B29C 45/0025 |
| | | | | 359/627 |
| 2014/0226988 A1* | 8/2014 | Shao | ............... | H04B 10/40 |
| | | | | 398/139 |
| 2014/0226991 A1* | 8/2014 | Hui | ............... | H04B 10/2503 |
| | | | | 398/141 |

* cited by examiner

OPTICAL ASSEMBLY

CROSS-REFERENCE TO RELATED APPLICATIONS

This application claims the benefit of priority to Chinese Patent Application No. 201420172931.5, filed Apr. 11, 2014, and Chinese Patent Application No. 201420172946.1, filed Apr. 11, 2014.

TECHNICAL FIELD

This disclosure is related to the field of optical transceiver module technology and, in particular, to an optical assembly.

BACKGROUND

With the development of science and technology, high-speed signal transmission technologies have been adopted widely. Compared to electrical transmission, optical connection can transmit signals over a much wider bandwidth and allow construction of signal transmission systems with optical components that are much smaller in size and lower in power consumption. Therefore, increasing attention has been directed to optical connection as the technology for signal transmission between devices. Accordingly, optical assemblies installed in computers, automobiles, or optical transceiver modules, etc., as electric components have been applied widely.

For example, the Chinese Patent Application No. 201320424531.4, entitled "Optical Assembly for Realizing Beam-Splitting Energy Control," discloses an optical assembly. The optical assembly comprises a base body, a slot disposed on the upper surface of the base body, and a wave filtering apparatus disposed in the slot.

Existing structures have limitations. In existing structures, adhesive is disposed on the optical path to secure the wave filtering apparatus to an inclined surface of the slot. As the temperature rises during the operation of the assembly, the adhesive experiences thermal expansion and contraction, causing changes in the surface of the adhesive. As a result, when light travels into the adhesive from air, the angle of incidence changes, leading to other changes, such as changes in the angle of refraction and the direction that the light beam travels. As a result, coupling efficiency of the assembly may be adversely affected, and signal loss is increased. The adhesive on the optical path of such an existing structure has a significant impact on the reliability and stability of the optical assembly.

SUMMARY OF THE DISCLOSURE

In order to solve the aforementioned problem, this disclosure provides an optical assembly that utilizes the internal space of the base body and avoids the use of adhesive on the optical path, effectively improving the reliability and stability of the optical assembly.

One embodiment in this disclosure provides an optical assembly, wherein the assembly comprises a base body, a wave filtering apparatus, and a circuit board. A first slot is disposed on a surface of the base body, and a second slot is disposed on an opposing surface of the base body. An optical transmission opening is disposed on a surface of the base body adjacent to the surfaces on which the first slot and the second slot are disposed.

The circuit board is disposed near the first slot, and a light emitting apparatus and a photoelectric detection apparatus are disposed on the circuit board.

A total internal reflection surface and a connecting part are formed in the second slot. The total internal reflection surface can reflect the light emitted from the light emitting apparatus, and the wave filtering apparatus is affixed in the second slot through the connecting part.

The wave filtering apparatus comprises a first part removably connected to the connecting part, and a second part forming a beam splitting surface.

Light is transmitted from the light emitting apparatus, and reaches the total internal reflection surface after going through the bottom of the first slot. The light is then reflected by the total internal reflection surface before reaching the beam splitting surface of the wave filtering apparatus. The beam splitting surface of the wave filtering apparatus splits the light reflected from the total internal reflection surface into a first beam and a second beam. The first beam travels towards the optical transmission opening after passing through the wave filtering apparatus, and the second beam travels towards the photoelectric detection apparatus.

In one embodiment, a protruding piece forms in the second slot, and the total internal reflection surface is formed on an inclined wall of the protruding piece.

In one embodiment, a guiding element is disposed on the surface, where a light output port of the base body is located.

In one embodiment, a total internal reflection surface on the receiving end is also disposed in the second slot of the base body to reflect light that enters into the base body from the light output port, and a photoelectric detection apparatus at the receiving end is also disposed on the circuit board to receive the light totally reflected from the receiving end.

In one embodiment, multiple lenses are disposed at the bottom of the first slot. The lenses convert the light coming from the light emitting apparatus into collimated light and then transmit the light to the total internal reflection surface. The lenses converge the light that is reflected by the wave filtering apparatus and direct the converged light to the photoelectric detection apparatus.

In one embodiment, the light emitting apparatus includes vertical cavity surface emitting laser (VCSEL) arrays and the photoelectric detection apparatus includes monitor photo detector (MPD) arrays.

In one embodiment, an optical assembly includes a base body, a wave filtering apparatus, a circuit board connected to a lower surface of the base body a light emitting apparatus, and a photoelectric detection apparatus disposed on a surface of the circuit board that is closer to the base body.

The base body has a primary integrated structure, a total internal reflection surface is disposed on an upper surface of the base body, and a first slot is disposed on a lower surface of the base body.

A protruding piece is set at the bottom of the first slot, the wave filtering apparatus is removably connected to the protruding piece, the protruding piece is disposed above but offset from the light emitting apparatus, and the light coming from the light emitting apparatus reaches the total internal reflection surface directly through the wave filtering apparatus.

A side surface of the base body has an optical transmission opening, and the optical transmission opening is placed corresponding to the total internal reflection surface.

The light coming from the light emitting apparatus travels to the wave filtering apparatus. The wave filtering apparatus splits the light coming from the light emitting apparatus into a first light beam and a second light beam in a given proportion. The first light beam is directed towards the optical transmission opening after reflected by the total internal reflection surface. The second light beam is directed towards the photoelectric detection apparatus.

In one embodiment, a second slot is disposed on the upper surface of the base body, and the total internal reflection surface is set on a side wall of the second slot.

In one embodiment, the protruding piece has an inclined surface. Part (i.e., a first portion) of the wave filtering apparatus is connected to the inclined surface of the protruding piece, and the other part (i.e., a second portion) of the wave filtering apparatus is disposed on the optical path of the light coming from the light emitting apparatus.

In one embodiment, the light emitting apparatus includes VCSEL arrays and the photoelectric detection apparatus includes MPD arrays.

Compared to prior art, the optical assembly provided disclosed here does not have an adhesive disposed on the optical path, and can significantly improve reliability and stability by forming a connecting part in the first slot, connecting the first part of the wave filtering apparatus to the connecting part in a removable manner, and forming a beam splitting surface on the second part of the wave filtering apparatus. In addition, the optical assembly allows construction of an improved optical transmission path by forming a total internal reflection surface in the first slot.

BRIEF DESCRIPTION OF THE ATTACHED DRAWINGS

DETAILED DESCRIPTION OF EMBODIMENTS

Figure 1:
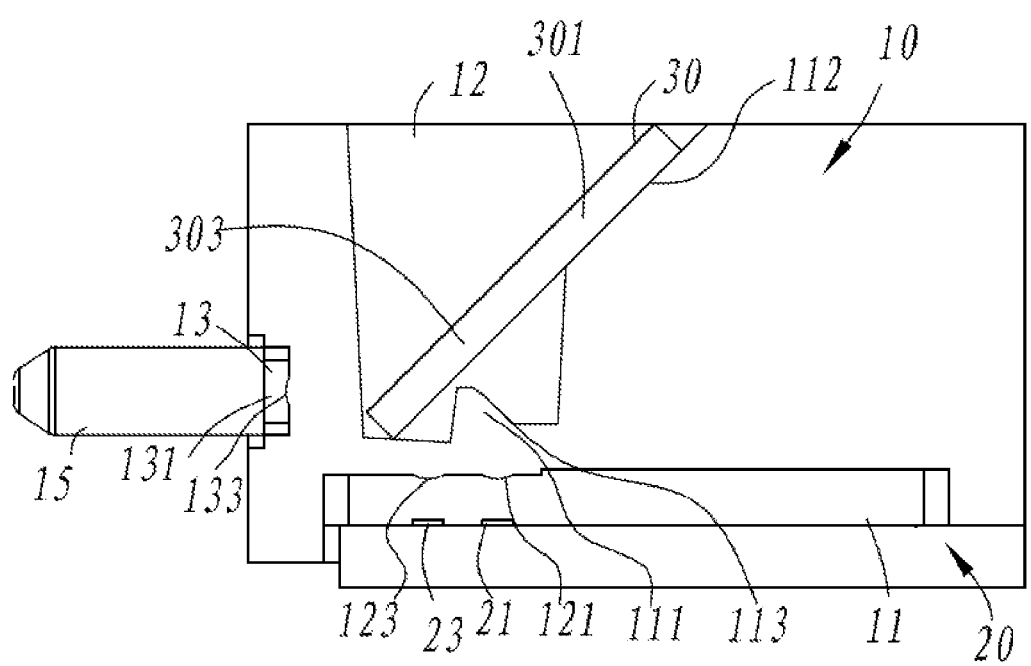
FIG. 1 is a schematic diagram showing the optical assembly for Embodiment Example 1 of the disclosure.

The text below provides detailed descriptions of embodiments of the disclosure as shown in the drawings. However, these embodiments do not limit the disclosure. The scope of protection for the disclosure covers changes made to the structure, method, or function by persons of ordinary skill in the art based on the embodiments.

In order to facilitate the description, detailed descriptions are given from the perspective of an observing operator. Up (upper), down (lower), left, and right in the text below are all relative perspectives.

Exemplary Embodiment 1

Figure 2:
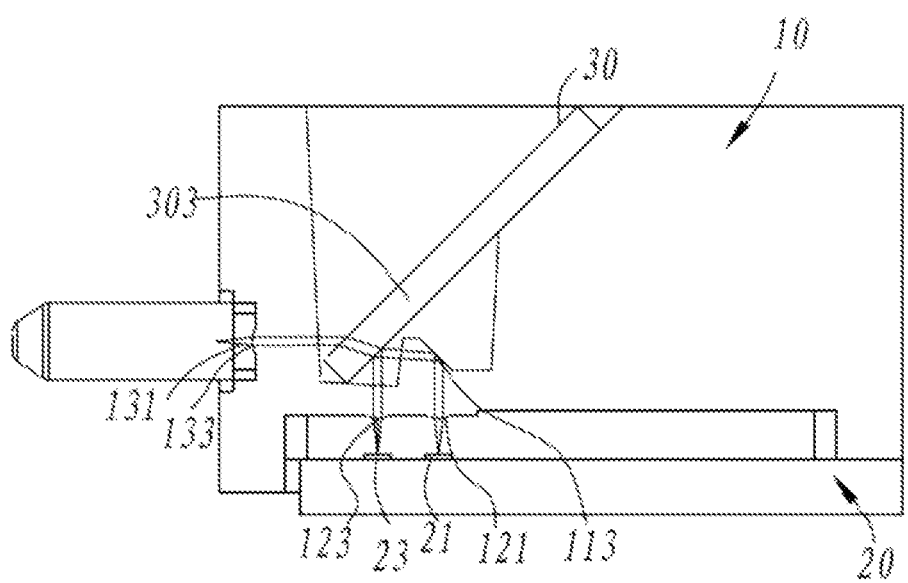
FIG. 2 is a diagram showing the light transmission path for the transmitting route of the optical assembly shown in FIG. 1.
Figure 3:
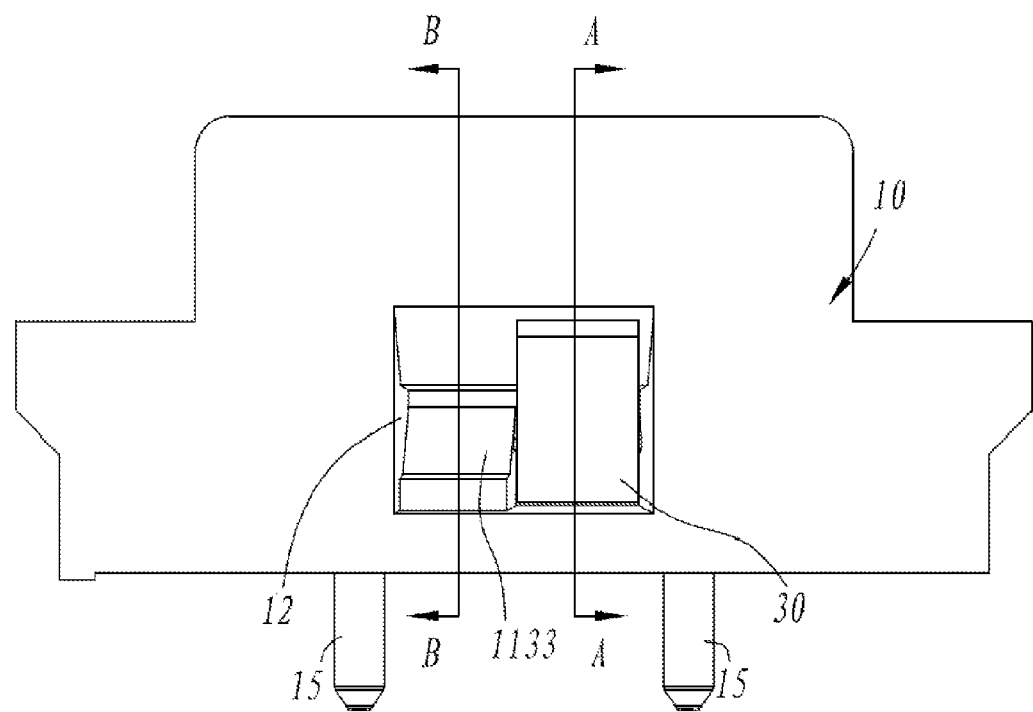
FIG. 3 is a top-view schematic diagram showing the optical assembly shown in FIG. 1.
Figure 4:
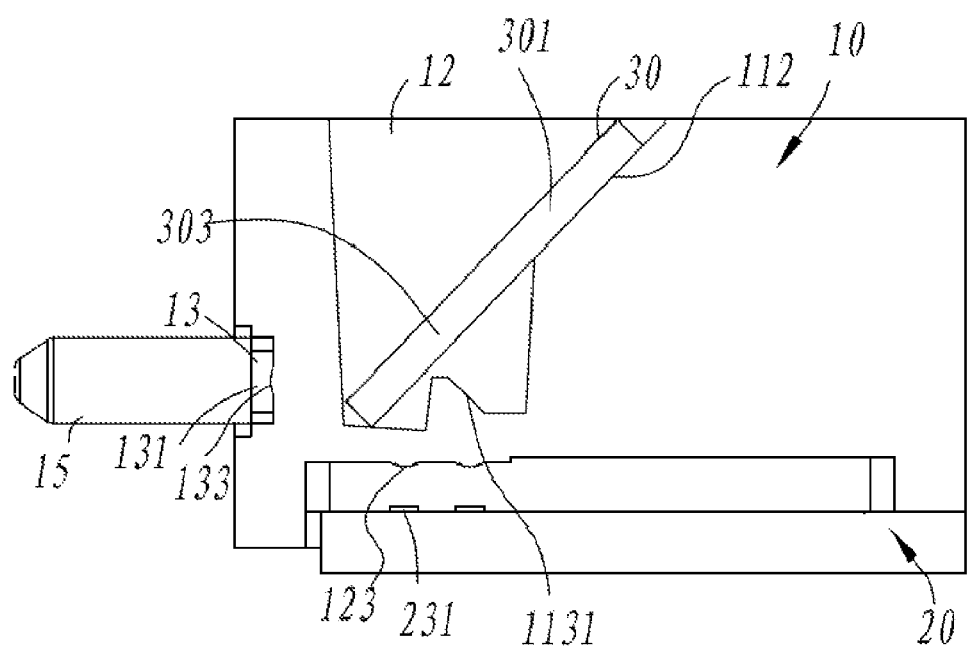
FIG. 4 is a cross-sectional-view schematic diagram showing the optical assembly in FIG. 3 in the A-A direction.
Figure 5:
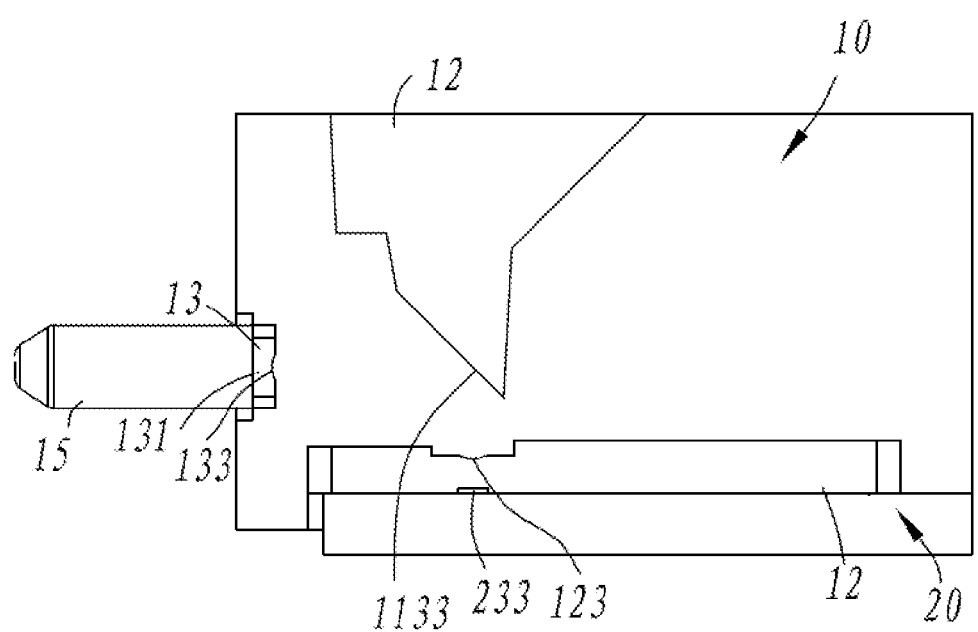
FIG. 5 is a cross-sectional-view schematic diagram showing the optical assembly in FIG. 3 in the B-B direction.
Figure 6:
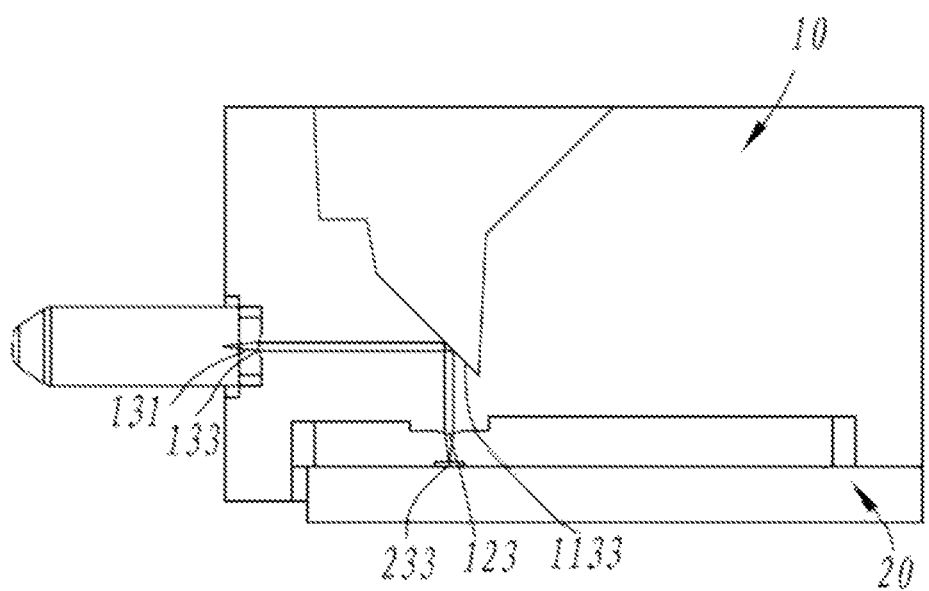
FIG. 6 is a diagram showing the light transmission path for the receiving route of the optical assembly of FIG. 5.
Figure 7:
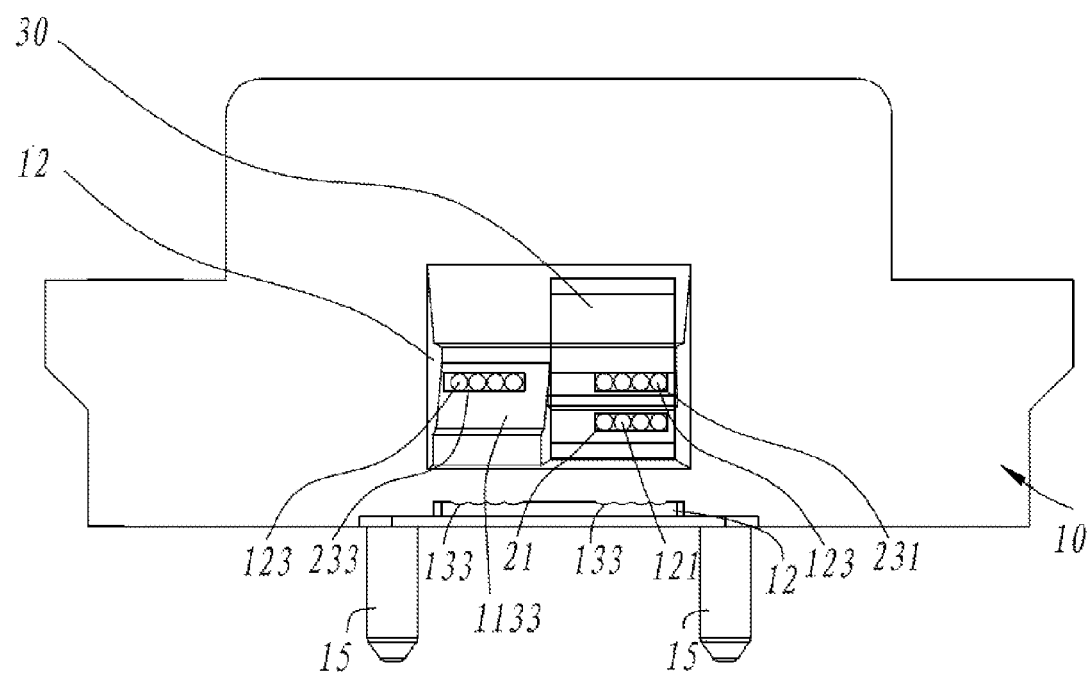
FIG. 7 is a top-view schematic diagram showing the multichannel optical assembly.

As shown in FIG. 1 and FIG. 2, the optical assembly in the application comprises: a base body 10 and a circuit board 20 connected to a lower surface of the base body 10. A light emitting apparatus 21 and a photoelectric detection apparatus 23 are disposed on the surface of a circuit board 20 that is close to the base body 10.

Accordingly, the base body 10 is made in one piece from material including heat-resistant optical polymers, such as resin. A first slot 11 is disposed on a lower surface of the base body, and a second slot 12 is disposed on an upper surface of the base body 10. An optical transmission opening (i.e., an optical port) 131 is disposed on a side surface of the base body 10 adjacent to the upper and lower surfaces on which the second slot 12 and the first slot 11 are disposed. In the second slot 12, a total internal reflection surface 113 is formed, and a wave filtering apparatus 30 is removably connected. The wave filtering apparatus 30 is used to split the light beam and distribute optical energy. Placing both the total internal reflection surface 113 and the wave filtering apparatus 30 in the second slot 12 allows leverage of the internal space of the base body 10 and optimization of the optical transmission path. A first lens 121 and a second lens 123 are disposed at the bottom of the first slot 11. The first lens 121 is disposed between the light emitting apparatus 21 and the total internal reflection surface 113, and used to convert the light coming from the light emitting apparatus 21 into collimated light, which then travels to the total internal reflection surface 113. The second lens 123 is disposed between the wave filtering apparatus 30 and the photoelectric detection apparatus 23, and it is used to converge the collimated light refracted from the wave filtering apparatus 30 onto the photoelectric detection apparatus 23. A third lens 133 is also disposed on a side surface of the base body 10 and corresponds to the wave filtering apparatus 30. In other words, the third lens 133 is disposed in the optical transmission opening 131.

In the first slot 12, a protruding piece 111 may also be formed. The protruding piece 111 has an inclined wall. The inclined wall includes the total internal reflection surface 113 discussed above. The total internal reflection surface 113 is used to reset or change the direction of the light beam. For example, the direction of the light beam may be changed by 90° by the total internal reflection surface 113.

Persons of ordinary skill in the art will appreciate that there are multiple methods to reset or change the direction of a light beam. For example, setting a total internal reflection mirror on the inclined wall can form a total internal reflection surface 113 on the inclined wall. In this embodiment, the inclined wall serves as a total internal reflection surface, as the light is totally reflected at the interface between the base body and air.

Of course, in other embodiments, the location of the total internal reflection surface 113 is not restricted to the inside of the second slot 12. A side wall of the base body 10 can also be modified to form the total internal reflection surface 113. Alternatively, a fourth slot can be formed on the upper surface of the base body 10, and a side wall of the fourth slot can be modified to form a total internal reflection surface.

A connecting part 112 is formed in the second slot 12, and the wave filtering apparatus 30 is removably connected to the connecting part 112. A light-pervious optical coating is disposed on one surface of the wave filtering apparatus 30, in order to split the collimated light reflected from the total internal reflection surface 113 into a first beam and a second beam. The first beam travels towards the third lens 133, and the second beam travels towards the photoelectric detection apparatus 23.

In this embodiment, the wave filtering apparatus 30 comprises a first part 301 removably connected to the connecting part 112, and a second part 303 forming a beam splitting surface. The lower surface of the first part 301 is removably connected to the connecting part 112. For example, the lower surface of the first part 301 is removably connected to the connecting part 112 by adhesive. The upper surface of the first part 301 faces towards the optical transmission opening 131. The second part 303 is set on the optical path of the light reflected from the total internal reflection surface 113.

The wave filtering apparatus 30 has a light-pervious optical coating on the beam splitting surface, such as glass, in order to split the collimated light reflected from the total internal reflection surface 113 into a first beam and a second beam. The first beam travels towards the third lens 133, and the second beam travels towards the photoelectric detection apparatus 23.

The optical coating can be designed according to the user's needs for splitting the light. For example, the optical coating may be configured to split the light coming through the optically coated wave filtering apparatus 30, so that 10% is reflected and 90% is refracted; or 5% is reflected and 95% is refracted. In this manner, the splitting of the light can be controlled in the optical assembly.

Compared to prior art, the involvement of the connecting part in the transmission of light between the wave filtering apparatus 30 and the second slot 12 can be avoided by simply setting the second part 303 of the wave filtering apparatus 30, which does not have adhesive, on the optical path of the light. As a result, no adhesive is disposed on the optical path. Thus, when the temperature rises or falls, the thermal expansion or contraction of the adhesive does not change the optical characteristics of the optical path. Therefore, there is no change or only a minimal change in the direction of the transmitted light beam. As a result, a reduction of coupling efficiency and a loss from signals is prevented, and the reliability and stability of the optical assembly is significantly improved.

Additionally, a third lens 133 is disposed on the side wall of the base body 10 where the optical transmission opening 131 is formed. The third lens 133 is used to converge the collimated light refracted from the wave filtering apparatus 30 onto the optical transmission opening 131. The third lens 133 is disposed between the wave filtering apparatus 30 and the optical transmission opening 131.

It needs to be noted that the optical transmission opening 131 may be disposed directly on a side wall of the base body 10. Alternatively, a separately designated slot may be set on a side wall of the base body 10 to house the optical transmission opening 131 and third lens 133. The optical transmission opening 131 may also be the side wall of the base body 10. Accordingly, a third slot 13 is also disposed on a side wall of the base body 10, and the optical transmission opening 131 is formed in the third slot 13. The third lens 133 is disposed at the bottom of the third slot 13 corresponding to the optical transmission opening 131.

Additionally, the central axes of the first lens 121 and the second lens 123 are parallel to one another. These axes are perpendicular to that of the third lens 133. A guiding element 15 is also disposed on the side wall, on which the optical transmission opening 131 is located. The disposed guiding element 15 is used to connect the optical assembly with other components.

When the circuit board 20 is connected to the base body 10, the light emitting apparatus 21 and the photoelectric detection apparatus 23 are located in the first slot 11.

The light emitting apparatus 21 is a vertical cavity surface emitting laser (VCSEL) and the photoelectric detection apparatus 23 is a monitor photo detector (MPD).

In a single-channel optical assembly, there is one VCSEL and one MPD.

Person of ordinary skill in the art will appreciate that that in other embodiments, a through-hole may be placed on the base body 10 in order to facilitate the release of water vapor in the base body 10. Additionally, depending on actual need, other components such as a latching opening may be disposed on the base body 10 to facilitate the attachment of other components.

Of course, in the aforementioned embodiments, the circuit board may comprise a trans-impedance amplifier (TIA), a laser driver chip that is used to drive the light emitting apparatus, and the like, as known in the art.

Compared to prior art, the optical assembly provided by this disclosure avoids the presence of any adhesive on the optical path and can significantly improve the reliability and stability of the optical assembly by forming a connecting part in the first slot, connecting the first part of the wave filtering apparatus to the connecting part in a removable manner, forming a beam splitting surface on the second part of the wave filtering apparatus, and disposing a light-pervious optical coating on at least the beam splitting surface of the wave filtering apparatus. The optical assembly forms an improved optical transmission path based on a total internal reflection surface in the first slot.

Further, in order to achieve duplex transmission of light beams in the base body 10, an emitting end and a receiving end may be integrated in a single base body. Accordingly, the numbers of the photoelectric detection apparatus, light emitting apparatus, and corresponding lenses may be properly increased to allow concurrent transmissions over multiple channels. This embodiment is further shown in FIGS. 3-7.

In this case, the photoelectric detection apparatus 23 of the optical assembly comprises a photoelectric detection apparatus 231 for the emitting end and a photoelectric detection apparatus 233 for the receiving end. The photoelectric detection apparatus 231 for the emitting end and the photoelectric detection apparatus 233 for the receiving end are both connected to the circuit board 20 electrically. The total internal reflection surface 113 comprises a total internal reflection surface 1131 for the emitting end and a total internal reflection surface 1133 for the receiving end.

The total internal reflection surface 1133 for the receiving end is set in the second slot 12 and is used to reset or change the direction of the light beam, so as to change the direction of the light beam by, for example, 90°.

The location of the total internal reflection surface 1133 for the receiving end 1133 is not restricted to inside of the second slot 12.

In addition, the total internal reflection surface 1133 for the receiving end is formed on the other side wall of the second slot 12. A platform or a step is formed between the other side wall of the second slot 12 and the opening of the second slot 12, to facilitate demolding when the base body 10 is manufactured and increase the strength of the base body.

The light emitting apparatus 21 is located below the total internal reflection surface 113. The photoelectric detection apparatus 231 for at the emitting end is located below the total internal reflection surface 1131 for the emitting end. The photoelectric detection apparatus 233 for the receiving end is located below the total internal reflection surface 1133 for the receiving end.

According to an embodiment, the number of the optical transmission openings 131 is two—one for light emission and the other for light reception.

Corresponding third lenses 133 are disposed at each of the two optical transmission openings 131. One of the third lenses 133 is used to converge a large portion of the collimated light refracted from the wave filtering apparatus 30 to the optical transmission opening 131, and the other one of the third lens 133 is used to form collimated light based on the light received from the optical transmission opening 131 and to send the collimated light to the total internal reflection surface 1133 for the receiving end.

In case of concurrent transmission over multiple channels, the light emitting apparatus 21 comprises VCSEL arrays and the photoelectric detection apparatus comprises MPD arrays. At least two first lenses 121, at least two second lenses 123, at least two optical transmission openings 131, and at least two third lenses 133 are disposed on the base body 10. Optical transmission follows the same principles as that of the single channel discussed above.

Compared to prior art, the optical assembly provided by this disclosure avoids the presence of any adhesive on the optical path and can significantly improve the reliability and stability of the optical assembly by forming a connecting part in the first slot, connecting the first part of the wave filtering apparatus to the connecting part in a removable manner, forming a beam splitting surface on the second part of the wave filtering apparatus, and disposing a light-pervious optical coating on at least the beam splitting surface of the wave filtering apparatus. The optical assembly forms an improved optical transmission path based on a total internal reflection surface in the first slot.

Exemplary Embodiment 2

Similar to the optical assembly in exemplary embodiment 1 above, the optical assembly in this embodiment comprises a total internal reflection surface, a light transmission opening (i.e., an optical port), a light emitting apparatus, a photoelectric detection apparatus, a circuit board, and a wave filtering apparatus. It may also provide concurrent sending and receiving of light over multiple channels. The difference between the optical assembly in this embodiment and that in exemplary embodiment 1 is: in exemplary embodiment 1, the wave filtering apparatus is disposed on the optical path between the total internal reflection surface and the light transmission opening, whereas in this embodiment, the wave filtering apparatus is disposed on the optical path between the light emitting apparatus and the total internal reflection surface.

Figure 8:
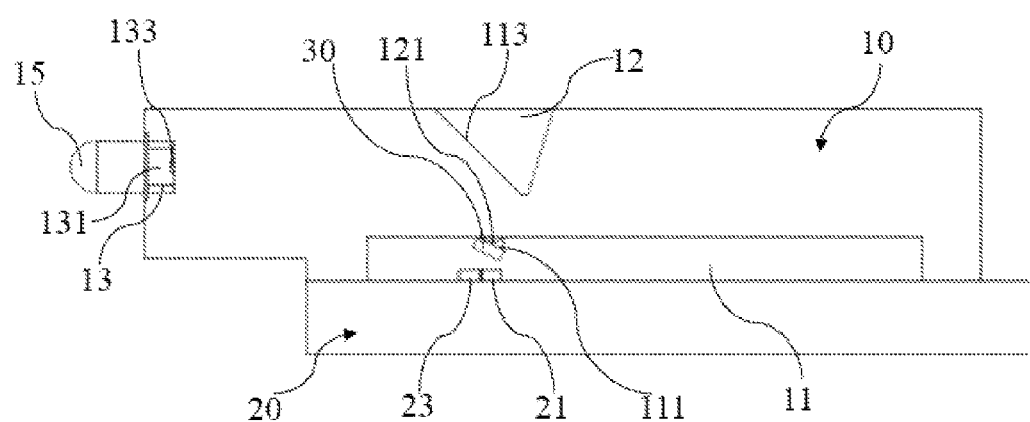
FIG. 8 is a schematic diagram showing the optical assembly according to another embodiment.
Figure 9:
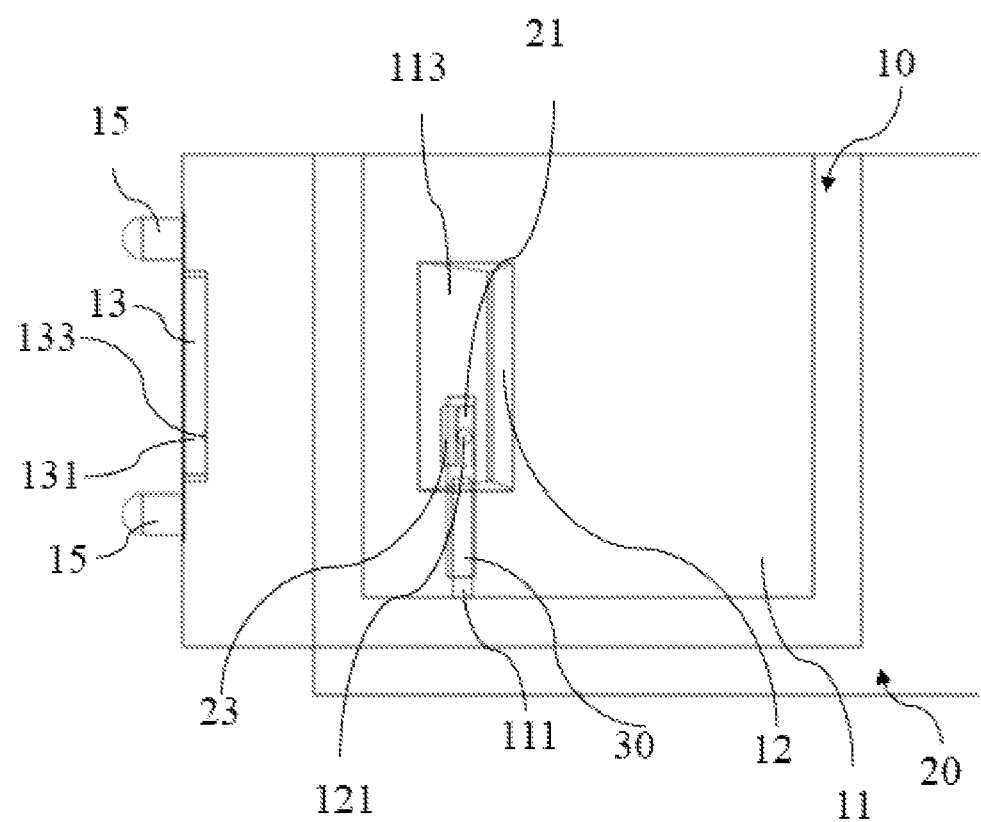
FIG. 9 is a top-view schematic diagram showing the optical assembly in FIG. 8.
Figure 10:
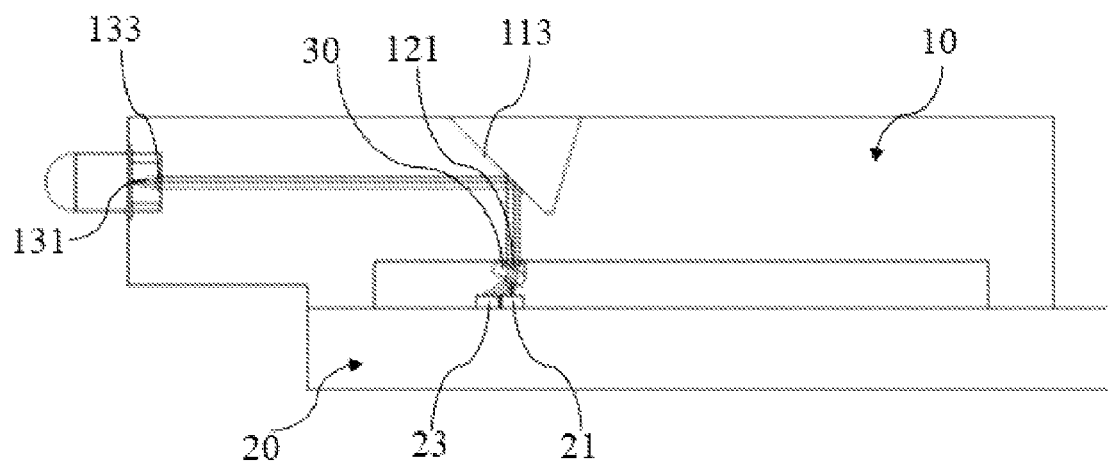
FIG. 10 is a diagram showing the light transmission path for the transmitting route of the optical assembly shown in FIG. 8.

As shown in FIGS. 8-10, the optical assembly in this embodiment comprises a base body 10 and a circuit board 20.

The base body 10 is formed in one piece from material including heat-resistant optical polymers, such as resin. A total internal reflection surface 113 is disposed on the upper surface of the base body 10, and a first slot 11 is disposed on the lower surface of the base body 10. A first lens 121 and a wave filtering apparatus 30 are disposed on the first slot 11. The first lens 121 is disposed between the wave filtering apparatus 30 and the total internal reflection surface 113, and it is used to convert the light refracted from the wave filtering apparatus 30 into collimated light, which then travels to the total internal reflection surface 113. The wave filtering apparatus 30 is used to split the light beam and distribute optical energy.

A side wall of the base body 10 may include the total internal reflection surface 113. Alternatively, a second slot can be disposed on the upper surface of the base body 10, and a side wall of the second slot 12 is configured to be inclined, forming the total internal reflection surface 113. The total internal reflection surface 113 is used to reset or change the direction of the light beam by, for example, 90°.

A protruding piece 111 is also disposed on the bottom of the first slot 11. The wave filtering apparatus 30 is removably connected to the protruding piece 111. The protruding piece 111 has an inclined surface. The wave filtering apparatus 30 is removably connected to the inclined surface of the protruding piece 111. The protruding piece 111 and the first slot 11 form an integrated structure.

An optical transmission opening 131 is formed on the side wall surface of the base body 10 opposing the total internal reflection surface of the base body 10. The optical transmission opening 131 can be used to house optical apparatuses. The optical apparatuses are used to send and/or receive light beams through, for example, optical fibers. Corresponding to the optical transmission opening 131, a second lens 133 is disposed on the side wall of the base body 10. The second lens 133 is used to converge the collimated light reflected from the total internal reflection surface 113 onto the optical transmission opening. And the second lens 133 is disposed between the total internal reflection surface 113 and the optical transmission opening.

Persons of ordinary skill in the art will appreciate that the optical transmission opening 131 may be disposed directly on another side wall of the base body 10. Alternatively, a separately designated slot may be disposed on another side wall of the side surface of the base body 10, in order to form the optical transmission opening 131 and house the second lens 133. In this embodiment, a third slot 13 is disposed on another side wall of the base body 10. The optical transmission opening 131 is formed in the third slot 13. The third lens 133 is also disposed at the bottom of the second slot 13 corresponding to the optical transmission opening 131.

A guiding element 15 is also disposed on the side surface on which the optical transmission opening 131 is located. The guiding element 15 is used to connect the optical assembly with other parts and units. Of course, the guiding element 15 may also be set at other locations on the base body 10.

The optical assembly also comprises a circuit board 20 connected to the lower surface of the base body 10. A light emitting apparatus 21 and a photoelectric detection apparatus 23 are disposed on the surface of circuit board 20 that is close to base body 10. The light emitting apparatus 21 and the photoelectric detection apparatus 23 are both disposed on the circuit board 20.

When the circuit board 20 is connected to the base body 10, the light emitting apparatus 21 and the photoelectric detection apparatus 23 are located in the first slot 11. The light emitting apparatus 21 and the photoelectric detection apparatus 23 are located below the wave filtering apparatus 30, and horizontally offset from the protruding piece 111.

The wave filtering apparatus 30 comprises two parts, one part used to connect with the protruding piece 111 in a removable manner and the other part disposed on the optical path of the light coming from the light emitting apparatus 21. An optical coating is formed on the portion of the lower surface of the wave filtering apparatus 30 that corresponds to the portion of its upper surface not connected to the protruding piece 111, in order to achieve the beam splitting effect and reduce the use and cost of the optical coating material.

Additionally, only the part extending from the upper surface of the wave filtering apparatus 30 is set on the optical path of the light coming from the light emitting apparatus 21. The involvement of the connecting part in the transmission of light between the wave filtering apparatus 30 and the protruding piece 111 may be avoided. Compared to prior art, this improves coupling efficiency and reduces signal loss because no adhesive is present on the optical path. Without the presence of adhesive on the optical path, as the temperature rises or falls, the thermal expansion or contraction of the adhesive does not adversely affect the surface characteristics, such as surface shape and radian, of the total reflection elements. This in turn eliminates or reduces the change in the angle of incidence when the light enters the adhesive and other changes, such as change in the angle of refraction and change in the direction in which the light beam travels.

Compared to prior art, the optical assembly in this embodiment reduces the distance between the light emitting apparatus and the wave filtering apparatus, and thus shortens the transmission path of the light beam. It reduces the distance between the light emitting apparatus and the photoelectric detection apparatus and reasonably leverages the overall spatial layout. As a result, the size of the light emitting apparatus may be made smaller, and cost-saving can be achieved in manufacturing. Additionally, the structure of this optical assembly does not place an adhesive in the optical path, significantly improving the reliability and stability of the optical assembly.

It should be understood that despite the descriptions of embodiments in the specification, there is not only one independent technical design for each embodiment. The specification is written simply for the purpose of clarity. The specification should be viewed as a whole. The technical designs in various embodiments may be combined in appropriate ways to form other embodiments that can be understood by persons of ordinary skill in the art.

The series of detailed descriptions above is only intended to provide specific descriptions of feasible embodiments of the disclosure. The detailed descriptions are not to be construed as limiting the scope of protection for the disclosure. All equivalent embodiments or changes that do not deviate from the technical spirit of the present disclosure should fall under its scope of protection.

The invention claimed is:

1. An optical assembly, comprising:
a base body;
a wave filtering apparatus comprising a beam splitting surface; and
a circuit board,
wherein:
a first slot is disposed on a first surface of the base body,
a second slot is set on a second surface of the base body opposing the first surface of the base body,
an optical transmission opening is disposed on a side surface of the base body adjacent to said first and second surfaces,
the circuit board is connected to the first surface of the base body,
a light emitting apparatus and a photoelectric detection apparatus are disposed on the circuit board, the light emitting apparatus being configured to emit light,
a total internal reflection surface and a connecting part are formed in the second slot,
the total internal reflection surface is configured to reflect light emitted from the light emitting apparatus,
the wave filtering apparatus is affixed in the second slot through the connecting part,
the wave filtering apparatus comprises a lower surface, a first part of the lower surface being connected to the connecting part by an adhesive, and a second part of the lower surface having no adhesive disposed thereon;
the light emitting apparatus is configured to emit the light towards the total internal reflection surface through a bottom surface of the first slot,
the total internal reflection surface is configured to reflect the light from the light emitting apparatus towards the beam splitting surface of the wave filtering apparatus, and
the beam splitting surface of the wave filtering apparatus is configured to split the light reflected from the total internal reflection surface into a first beam and a second beam, the first beam being directed towards the optical transmission opening after reflected by the total internal reflection surface, and the second beam being directed towards the photoelectric detection apparatus.

2. The optical assembly according to claim 1, wherein the second slot includes a protruding piece formed therein, and the total internal reflection surface is formed on an inclined wall of the protruding piece.

3. The optical assembly according to claim 1, wherein a guiding element is disposed on the side surface of the base body.

4. The optical assembly according to claim 1, wherein a first and a second lenses are disposed on the bottom surface of the first slot, the first lens is configured to convert the light coming from the light emitting apparatus into collimated light and transmit the collimated light to the total internal reflection surface, and the second lens is configured to converge the second beam of light reflected from the wave filtering apparatus and direct the converged light to the photoelectric detection apparatus.

5. The optical assembly according to claim 1, wherein the light emitting apparatus includes vertical cavity surface emitting laser (VCSEL) arrays and the photoelectric detection apparatus includes monitor photo detector (MPD) arrays.

6. An optical assembly comprising:
a base body;
a wave filtering apparatus;
a circuit board connected to a lower surface of the base body; and
a light emitting apparatus and a photoelectric detection apparatus disposed on a surface of the circuit board facing towards the base body, the light emitting apparatus being configured to emit light,
wherein:
the base body is formed in one piece,
a total internal reflection surface is disposed on an upper surface of the base body, and a first slot is disposed on the lower surface of the base body,
a protruding piece is formed on a bottom surface of the first slot,
the wave filtering apparatus comprises a lower surface, a first part of the lower surface being connected to the protruding piece by an adhesive, and a second part of the lower surface having no adhesive disposed thereon,
the protruding piece is disposed above the light emitting apparatus and horizontally offset from the light emitting apparatus, a side surface of the base body has an optical transmission opening, and the optical transmission opening is placed corresponding to the total internal reflection surface, and the wave filtering apparatus is configured to split the light from the light emitting apparatus into a first light beam and a second light beam according to a predetermined proportion, and the first light beam being directed towards the total internal reflection surface, the total internal reflection surface being configured to totally reflect the first light beam, and the second light beam being directed towards the photoelectric detection apparatus.

7. The optical assembly according to claim 6, wherein a second slot is disposed on the upper surface of the base body, and the total internal reflection surface is disposed on a side wall of the second slot.

8. The optical assembly according to claim 6, wherein the protruding piece has an inclined surface, the first part of the lower surface of the wave filtering apparatus is connected to the inclined surface of the protruding piece, and the second part of the lower surface of the wave filtering apparatus is disposed on the optical path of the light coming from the light emitting apparatus.

9. The optical assembly according to claim 6, wherein the light emitting apparatus includes vertical cavity surface emitting laser (VCSEL) arrays and the photoelectric detection apparatus includes monitor photo detector (MPD) arrays.

10. An optical assembly, comprising:
a base body comprising a first slot disposed on a first surface of the base body and a second slot disposed on a second surface of the base body, the first surface opposing the second surface, the base body further comprising a plurality of optical transmission openings disposed on a side surface of the base body adjacent to the first and second surfaces;
a receiving end and a transmitting end disposed in the second slot of the base body; and
a circuit board connected to the first surface of the base body, wherein the transmitting end comprises:
a light emitting apparatus and a photoelectric detection apparatus disposed on the circuit board, the light emitting apparatus being configured to emit light,
a total internal reflection surface and a connecting part formed in the second slot, the total internal reflection surface being configured to reflect light emitted from the light emitting apparatus,
a wave filtering apparatus affixed in the second slot through the connecting part, the wave filtering apparatus comprising a lower surface having a first portion connected to the connecting part by an adhesive and a second portion having no adhesive disposed thereon,
the light emitting apparatus configured to emit the light towards the total internal reflection surface through a bottom surface of the first slot,
the total internal reflection surface configured to reflect the light from the light emitting apparatus towards a beam splitting surface of the wave filtering apparatus, and
the beam splitting surface of the wave filtering apparatus configured to split the light reflected from the total internal reflection surface into a first beam and a second beam, the first beam being directed towards the optical transmission opening after reflected by the total internal reflection surface, and the second beam being directed towards the photoelectric detection apparatus, and the receiving end comprises:
a total internal reflection surface disposed in the second slot of the base body to totally reflect light that enters into the base body from one of the optical transmission opening, and
a receiving end photoelectric detection apparatus disposed on the circuit board to receive the light totally reflected from the total internal reflection surface of the receiving end.

* * * * *